H. MORSE.
AEROPLANE PENDULUM BALANCE.
APPLICATION FILED MAR. 20, 1913.
1,099,508.
Patented June 9, 1914.
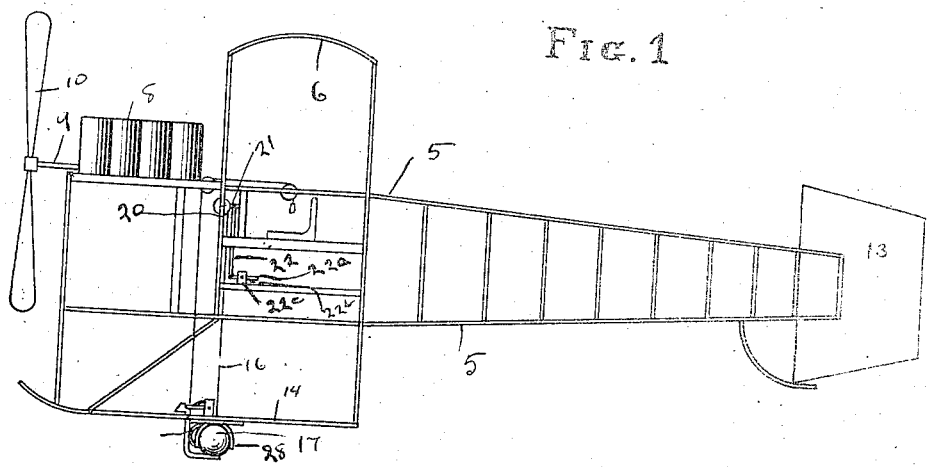
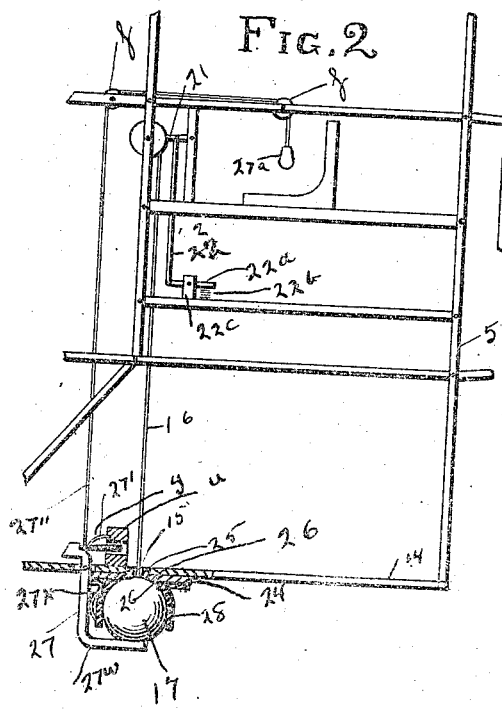
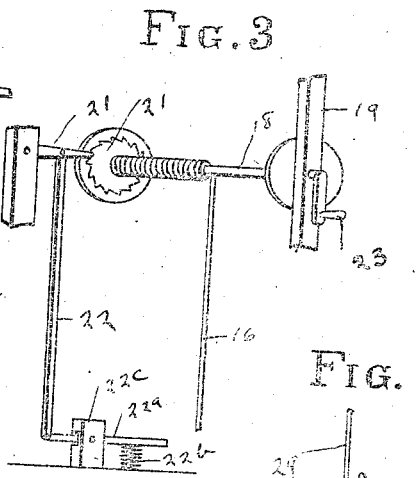
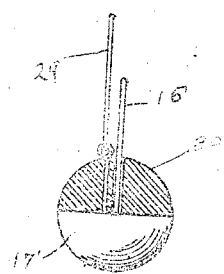
WITNESSES:
INVENTOR
HENRY MORSE
BY
Joseph J. O'Brien
ATTORNEY

UNITED STATES PATENT OFFICE.

HENRY MORSE, OF NEW YORK, N. Y.

AEROPLANE PENDULUM-BALANCE.

1,099,508. Specification of Letters Patent. Patented June 9, 1914.

Application filed March 20, 1913. Serial No. 755,773.

*To all whom it may concern:*

Be it known that I, HENRY MORSE, a citizen of the United States, residing at New York city, in the borough of Manhattan and State of New York, have invented certain new and useful Improvements in Aeroplane Pendulum-Balances, of which the following is a specification.

This invention relates to improvements in aeroplanes and particularly to means for balancing aeroplanes and other like aerial vehicles during their flight through the air, so that they will be rendered safe for the transport of persons, the dangers of overturning, which have resulted in frequent deaths of aviators and numerous injuries to persons, will be avoided; the usefulness of aerial vehicles extended; and the control of movement of the vehicles perfected, so that they will be rendered more serviceable to mankind.

The invention is designed to provide a simple automatically acting balancing means, which can be readily applied to any type of aerial vehicle, and which will be under the instant control of the aviator, so that it may be brought into operative position and moved out of operative position at will.

The invention is practically embodied in a specific type of balancing means, which includes a simple pendulum comprising a weight and a flexible support therefor, which is connected with suitable winding means carried by the aerial vehicle or machine, whereby the operator or aviator may instantly raise or lower the pendulum balance to meet the varying conditions of the wind, or to bring the device from lowered operative, balancing position, to elevated inoperative position.

With the above and other objects in view the invention comprises certain combinations, constructions, and arrangements of parts, clearly described in the accompanying specification and clearly illustrated in the accompanying drawings, in which:—

Figure 1 is a side elevation of an aeroplane provided with the improved balancing device. Fig. 2 is an enlarged side view of the balancing means and its mounting, with certain parts shown in section. Fig. 3 is a detail view of the winding means and the control therefor. Fig. 4 is a detail view, partly in section, of a modified form of the weight used for the pendulum.

Referring to the accompanying drawings illustrating the practical embodiment of the invention 5 denotes the main supporting frame of an aeroplane and 6 the main supporting plane thereof. The supporting frame and the supporting plane may be mounted on any suitable form of running gear. On the frame 5 a suitable engine or motor 8 is arranged, which is provided with the necessary fuel supply connections, and the shaft 9 of which carries a propelling screw 10, arranged in approved fashion. The usual rudder plane 13 is provided. The platform 14 of the vehicle or machine is provided with a guide opening 15, located in a vertical line of the center of gravity of the machine or vehicle, and through the guide opening 15 a flexible support 16, is adapted to operate. This flexible support 16 is in the form of a link chain, a rope or cable, or may be a flexible power shaft, and on its lower end a weight 17 is secured, which is adapted to hold a central position under the vehicle, relative to the center of gravity thereof, under normal conditions. The upper end of the flexible cable is secured to a rotating winding member 18, which may be in the form of a simple cranked axle or shaft, or in the form of a winding drum, and which is journaled by the bearings 19 and 20 on the supporting frame 5. The shaft or winding member 18 is provided with a pawl and ratchet mechanism 21, which may be operated through the medium of a foot release rod 22, so that the ball or weight 17 may be permitted to drop by gravity to its extreme lowered position, or to any elevation above this, whereby the weight or ball pendulum 17 will operate, to hold the machine or vehicle true to its safe flying or traveling position. The winding shaft or member 18 may be operated by means of a handle 23, by hand or by foot, so as to gradually lower the pendulum weight or ball 17, or it may be operated by suitable flexible connections controlled by the engine or motor.

In order to prevent undue wear upon the platform or upon the frame of the machine a reinforcing plate 24 is secured to the platform and is provided with a guide sleeve 25 of suitable hard wearing metal, which fits snugly in the opening 15. The reinforcing plate 24 may be concaved, as at 26, to form a pocket into which the ball pendulum weight 17 will snugly fit when the same is in its elevated position, and a latch 27 is preferably provided on said plate for holding said ball in its uppermost position independently of the action of the shaft or winding member 18. The under or lower face of the plate 24 may be provided with a cushion 28 of rubber or of other suitable material, so that the weighted ball will not crush the frame of the machine when it abuts thereagainst. The latch 27 is pivoted to the platform 14 and is provided with an arm 27ʷ, which provides a seat for the pendulum weight. The latch is held in pendulum supporting position by the dog 27′, which is pivoted at one end to the small block $u$, and which is held against the latch 27 by means of the small spring $y$, one end of which is suitably secured to the block $u$. A cord or operating element 27″ is connectd with the dog 27′ and is trained over pulleys or guides $f$, arranged on the frame, for guiding the cord or element 27″. The upper free end of the cord or element 27″ carries a small weight 27ᵃ, which serves as a handle. A spring 27ˣ is located between the rubber cushion cup 28 and the latch 27 and serves as a buffer for the latch. The foot release rod 22 is pivoted to the treadle 22ᵃ, which is supported by the block 22ᶜ and said treadle is spring pressed by the spring 22ᵇ. The latch 27 serves to positively support the weight and may be released from holding position by pulling upon the cord or element 27″, and then the treadle may be operated and the pawl and ratchet mechanism actuated to cause the weight to drop by gravity.

It will be seen that the improved balancing and safety device can be readily attached to any type of aerial vehicle or machine, whether a monoplane or multi-plane, and is simple in construction, easy to operate and control, and will effectively oppose all tendency of the machine to turn over, to "summersault" or "turn turtle", and thus avoids the dangers which usually confront aviators, and which have produced serious set-backs in the art of practical aviation.

If desired the weight 17 may be made in sections, so that its total mass may be readily increased to meet increased loads placed on the machine, or an auxiliary ball weight and pendulum 30 may be arranged on the platform so as to slide on the flexible support, and this auxiliary weight is provided with flexible support 29, whereby it may be independently elevated and lowered.

Having described my invention I claim:—

1. In combination with an aerial vehicle, a pendulum weight, a flexible cord support for the weight, means on the vehicle for operating the cord and holding it against movement to hold the weight elevated, and a latch for the weight supplementing the supporting action of the cord.

2. In combination, an aerial vehicle, a flexible support on the vehicle, a pawl and ratchet mechanism for controlling the flexible support, a treadle operated member for actuating the pawl and ratchet mechanism to release the flexible support, a pendulum weight on the flexible support, a rubber cushion cup for the pendulum weight located on the vehicle to serve as a buffer for the weight, and a latch on the vehicle forming a support for the weight.

In testimony whereof I affix my signature in presence of two witnesses.

HENRY MORSE.

Witnesses:
C. E. FETZER,
SAM'L W. COCKRELL.